(12) United States Patent
Lv et al.

(10) Patent No.: US 9,383,027 B2
(45) Date of Patent: Jul. 5, 2016

(54) ELECTRONIC EXPANSION VALVE

(75) Inventors: Ming Lv, Zhejiang Province (CN);
Yuzhong Chen, Zhejiang Province (CN)

(73) Assignee: Zhejiang Sanhua Co., Ltd., Zhejiang (CN)

( * ) Notice: Subject to any disclaimer, the term of this patent is extended or adjusted under 35 U.S.C. 154(b) by 180 days.

(21) Appl. No.: 14/124,225

(22) PCT Filed: Jun. 26, 2012

(86) PCT No.: PCT/CN2012/077522
§ 371 (c)(1),
(2), (4) Date: Dec. 5, 2013

(87) PCT Pub. No.: WO2013/000396
PCT Pub. Date: Jan. 3, 2013

(65) Prior Publication Data
US 2014/0103238 A1    Apr. 17, 2014

(30) Foreign Application Priority Data
Jun. 27, 2011    (CN) .......................... 2011 1 0175269

(51) Int. Cl.
*F16K 31/04*    (2006.01)
*F16K 25/00*    (2006.01)
(Continued)

(52) U.S. Cl.
CPC ............... *F16K 31/047* (2013.01); *F16K 3/246* (2013.01); *F16K 3/34* (2013.01); *F16K 25/005* (2013.01);
(Continued)

(58) Field of Classification Search
CPC ....... F16K 31/04; F16K 31/047; F16K 31/50; F16K 31/508; F25B 41/062; F25B 2341/0653
USPC .................................................... 251/129.11
See application file for complete search history.

(56) References Cited

U.S. PATENT DOCUMENTS 2,541,176 A * 2/1951 Rockwell .................... 137/625.3
3,001,551 A * 9/1961 Wyser ............................ 137/635
(Continued)

FOREIGN PATENT DOCUMENTS

CN          85103856 A     5/1987
CN          2703169 Y      6/2005
(Continued)

OTHER PUBLICATIONS

Extended European Search Report dated Jan. 30, 2015 and the European Search Opinion from corresponding European Application No. 12804061.
(Continued)

*Primary Examiner* — Marina Tietjen
*Assistant Examiner* — Seth W Mackay-Smith
(74) *Attorney, Agent, or Firm* — Wolf, Greenfield & Sacks, P.C.

(57) ABSTRACT

Disclosed in the present invention is an electronic expansion valve, which comprises a valve seat assembly (7) and a valve housing assembly (5) connected to the valve seat assembly (7). A valve stem assembly (6) and a valve port (121) are disposed in the chamber of the valve seat assembly (7), and an electrical motor (51) is situated in the chamber of the valve housing assembly (5). The electrical motor (51) drives the valve stem assembly (6) to move along an axial direction through a gear system (52) so as to adjust the flow rate of the fluid flowing through the valve port (121). The valve seat assembly (7) has a split structure, which comprises a valve seat (1) and a cover (9) connected to the valve seat (1) and to the valve housing assembly (5). A mounting surface (13) is formed on the outer side of the valve seat (1) and a sight glass (8) is connected thereon. The structure of the expansion valve enables the sight glass (8) to be easily attached to the valve seat assembly (7).

7 Claims, 10 Drawing Sheets

(51) Int. Cl.
  *F16K 1/02* (2006.01)
  *F16K 1/42* (2006.01)
  *F16K 37/00* (2006.01)
  *F16K 3/24* (2006.01)
  *F16K 3/34* (2006.01)
  *F25B 41/06* (2006.01)

(52) U.S. Cl.
  CPC ............ *F16K 31/04* (2013.01); *F16K 37/0058* (2013.01); *F25B 41/062* (2013.01); *F25B 2341/0653* (2013.01); *Y02B 30/72* (2013.01)

(56) References Cited

U.S. PATENT DOCUMENTS

| | | | | |
|---|---|---|---|---|
| 3,080,952 | A | * | 3/1963 | Carlstedt ........................... 477/8 |
| 3,347,270 | A | * | 10/1967 | Cranage ................... 137/630.15 |
| 3,525,234 | A | * | 8/1970 | Widdowson ..................... 62/217 |
| 3,533,598 | A | | 10/1970 | Tillman |
| 3,592,018 | A | * | 7/1971 | Widdowson ..................... 62/222 |
| 4,274,444 | A | * | 6/1981 | Ruyak ....................... 137/630.14 |
| 4,436,279 | A | | 3/1984 | Bonds et al. |
| 4,655,078 | A | | 4/1987 | Johnson |
| 5,318,064 | A | | 6/1994 | Reinicke |
| 5,364,066 | A | * | 11/1994 | Dorste et al. ................... 251/122 |
| 5,402,652 | A | * | 4/1995 | Alsenz ............................ 62/222 |
| 5,669,413 | A | * | 9/1997 | Hegglin et al. ............... 137/554 |
| 5,735,501 | A | | 4/1998 | Maurer et al. |
| 6,434,971 | B2 | * | 8/2002 | Fukuda et al. .................. 62/504 |
| 6,568,656 | B1 | | 5/2003 | Wrocklage |
| 7,240,694 | B2 | * | 7/2007 | Johnsen et al. .......... 137/630.15 |
| 8,327,883 | B2 | * | 12/2012 | Kannoo ...................... 137/625.43 |
| 2006/0005890 | A1 | | 1/2006 | Johnsen et al. |
| 2011/0001077 | A1 | * | 1/2011 | Masen .......................... 251/321 |
| 2011/0084224 | A1 | | 4/2011 | Zhan et al. |

FOREIGN PATENT DOCUMENTS

| | | |
|---|---|---|
| CN | 2735101 Y | 10/2005 |
| CN | 2775430 Y | 4/2006 |
| CN | 2823701 Y | 10/2006 |
| CN | 1985118 A | 6/2007 |
| CN | 200580023202.7 | 6/2007 |
| CN | 201013922 Y | 1/2008 |
| CN | 201265694 Y | 7/2009 |
| CN | 101749467 A | 6/2010 |
| CN | 101858455 A | 10/2010 |
| CN | 201706059 U | 1/2011 |
| CN | 102032380 A | 4/2011 |
| CN | 202109047 U | 1/2012 |
| CN | 202149257 U | 2/2012 |
| GB | 1072839 A | 6/1967 |
| GB | 0832023 A | 4/2006 |
| JP | 8004931 A | 1/1996 |
| JP | 8-303638 A | 11/1996 |
| JP | 3046444 U | 10/1998 |
| JP | 2002310541 A | 10/2002 |
| JP | 2007218364 A | 8/2007 |
| JP | 2008267464 A | 11/2008 |
| JP | 2009287769 A | 12/2009 |
| KR | 20080098725 A | 11/2008 |
| KR | 1020090064911 A | 6/2009 |
| KR | 1020090064912 A | 6/2009 |
| KR | 100944762 B | 3/2010 |
| SU | 1555583 A1 | 4/1990 |

OTHER PUBLICATIONS

International Search Report dated Oct. 4, 2012 from corresponding International Application No. PCT/CN2012/077522.

International Search Report dated Oct. 4, 2012 from potentially related International Application PCT/CN2012/077519.

International Search Report dated Oct. 4, 2012 from potentially related International Application No. PCT/CN2012/077516.

International Search Report dated Sep. 27, 2012 from potentially related International Application No. PCT/CN2012/077508.

Korean Office Action, dated Aug. 31, 2015, from corresponding Korean Patent Application No. 10-2014-7001847.

* cited by examiner

ELECTRONIC EXPANSION VALVE

The present application is the US national phase of International Application No. PCT/CN2012/077522 filed on Jun. 26, 2012, which claims the priority of Chinese Patent Application No. 201110175269.X titled "ELECTRONIC EXPANSION VALVE" and filed with the State Intellectual Property Office on Jun. 27, 2011, the entire disclosure of which is incorporated herein by reference.

FIELD OF THE INVENTION

The present application relates to the technical field of fluid control components, and particularly to an electronic expansion valve.

BACKGROUND OF THE INVENTION

An electronic expansion valve is one of the important components composing a refrigerating system, and is one of the four essential components in a refrigerating system with the other three including an evaporator, a compressor, and a condenser. The working process of the electronic expansion valve generally includes: as a coil device is powered on or off, adjusting, by a valve needle, the opening degree of a valve port so as to regulate the flow of refrigerant.

In the prior art, the U.S. Pat. No. 5,735,501A discloses an electronic expansion valve, and reference may be made to FIG. 1 for details, which is a schematic structural view of an electronic expansion valve in the prior art.

As shown in FIG. 1, the electronic expansion valve in the prior art includes a valve seat assembly 1' and a housing assembly 2'. A valve stem assembly 3' and a valve port 1'1 are provided inside the valve seat assembly 1'. An electric motor 2'1 is provided inside the housing assembly 2', and drives the valve stem assembly 3' to move up and down along the axial direction via a gear system 2'2 so as to regulate the flow of fluid flowing through the valve port 1'1. However, the electronic expansion valve in the prior art has the following disadvantages.

In the above electronic expansion valve, the valve seat assembly 1' is an integrated sleeve member, and is made of a tension member having a thin wall or a stainless steel tube. Due to the cylindrical shape of the side wall of the valve seat assembly 1', the manufacturability in connection with a sight glass is poor, and due to a saddle surface existing at a connecting position of the side wall of the valve seat assembly 1', an O-ring cannot be installed, which results in a poor sealing performance. Furthermore, due to the existence of the above saddle surface, a thread connection may be unsuited between the sight glass and the valve seat assembly 1'. If the thread connection must be adopted, the thickness of the wall of the cylindrical valve seat assembly 1' has to be increased, which may cause an increased material consumption, an increased cost, as well as a cumbersome product. In summary, the electronic expansion valve in the prior art is not adapted to be mounted with a sight glass, and due to without the sight glass, it is impossible to know the situation of the fluid inside the electronic expansion valve timely, therefore causing a lot of inconvenience for the user in using the electronic expansion valve.

Furthermore, the Chinese Patent No. 200580023202.7 also discloses an electronic expansion valve. In this electronic expansion valve, as shown in FIG. 2, the valve seat assembly 22, due to its more complex structure, is formed by making a blank with a brass casting firstly, and then being shaped through lathe machining. First, due to the property of casting technique, in which some defects such as slag inclusion and blow hole may inevitably exist in the material, after the products are mounted and used outdoors for a period of time, it may generate verdigris under corrosion and the defective part is the weakest. The pressure in a refrigerating system is greatly higher than that outside of the valve, so that it is prone to leakage or fracture of the valve body due to insufficient strength, which may affect the service life and liability of the product and may result in failure of the function of the whole refrigerating set, causing huge losses to the freshness preserving products stored in a large cold storage, a supermarket cooler or a refrigerator plant. Second, since the fusion point of the brass is approximately more than 930 degree, when braze welding is performed in a tunnel furnace teemed with reducing agent protection gas, the welding temperature of the procedure must be lower than the fusion point of the brass, and accordingly, a welding material with high silver content has to be adopted in welding a connecting tube and the brass valve body, causing a hugely increased costs of the welding because of the rising of the silver price. Third, since brass casting is performed by a mould, if the customer has a different requirement, the mounting positions of the connecting tube and the valve seat need to be adjusted, and therefore a new casting mould needs to be made. However, it may take a long manufacturing period to make a new mould, thus resulting in an increased cost of production.

In view of this, a technical problem to be solved presently by those skilled in the art is to improve the electronic expansion valve in the prior art so as to enable the sight glass to be connected to the valve seat assembly conveniently.

SUMMARY OF THE INVENTION

One technical problem to be solved by the present application is to provide an electronic expansion valve; the structure of which is designed such as to enable the sight glass to be easily connected to the valve seat assembly while ensuring the connecting process and connecting quality.

For solving the above technical problem, there is provided in the present application an electronic expansion valve including a valve seat assembly and a housing assembly connected with the valve seat assembly. A valve stem assembly and a valve port are provided in the inner chamber of the valve seat assembly, and an electric motor is provided in the inner chamber of the housing assembly. The electric motor drives, via a gear system, the valve stem assembly to move along an axial direction so as to regulate the quantity of fluid flowing through the valve port. The valve seat assembly is of a separable structure including a valve seat and a cover connected to the valve seat. The cover is connected with the housing assembly. A mounting plane is provided on an outer side surface of the valve seat, and a sight glass is connected to the mounting plane.

Preferably, the valve seat is further of a separable structure including an upper valve seat and a lower valve seat connected with the upper valve seat, and the cover is further connected to the upper valve seat. The mounting plane is further provided on an outer side surface of the upper valve seat.

Preferably, the upper valve seat is further a cubical valve seat, and any one of the outer side planes of the cubical valve seat is capable of forming the mounting plane.

Preferably, the valve port is provided in the lower valve seat, and is provided with a sleeve extension protruding upwards in an axial direction. The sleeve extension extends into the chamber of the upper valve seat, and the valve stem assembly is provided with a tubular valve stem. An opening groove configured to regulate the flow quantity is provided on a circumferential side wall of one of the sleeve extension and the lower end portion of the valve stem, and one of the sleeve extension and the lower end portion of the valve stem is configured to be pushed into or withdrawn out of the other so as to block or enable the communication between the opening groove and the valve port.

Preferably, the valve seat is further of an integrated structure, and is a cubical valve seat as a whole. Any one of the outer side surfaces of the cubical valve seat is capable of forming the mounting plane.

Preferably, the valve port is provided with a first step surface circumferentially. The valve stem assembly includes a tubular valve stem, and a second step surface and an opening groove configured to regulate the flow quantity are provided on the side wall of the lower end portion of the valve stem. The lower end portion of the valve stem is configured to be pushed into or withdrawn out of the valve port, such that the first step surface comes into contact seal against or is disengaged from the second step surface.

Preferably, a threaded hole is provided in the mounting plane. The sight glass includes a glass base. The glass base is connected into the threaded hole in a thread-fit way.

Preferably, a sealing member is further provided between the glass base and the wall of the threaded hole.

Preferably, the housing assembly includes a housing and a pin base connected with the housing. The housing assembly is connected to the cover by way of the housing, and pins are packaged in the pin base by injection moulding.

Preferably, the valve seat assembly is further a stainless steel valve seat assembly.

As compared with the prior art, the valve seat assembly of the electronic expansion valve according to the present application is of a separable structure including a valve seat and a cover connected to the valve seat. The cover is connected with the housing assembly. A mounting plane is provided on an outer side surface of the valve seat, and a sight glass is connected to the mounting plane.

Compared with the prior art, the valve seat assembly according to the present application is of a separable structure including a valve seat and a cover, and the cover is a cylindrical member easy to be connected with the housing assembly. Since the valve seat and the cover are separable, the valve seat may be a non-cylindrical member, for example, a cubical valve seat or a valve seat in any other shape on which a mounting plane is easy to be manufactured. Thus, the mounting plane is easy to be processed on the valve seat. As compared with the structure design of connecting a sight glass on a saddle surface, the structure design of connecting the sight glass onto the mounting plane enables an easy and simple connection with the sight glass while ensuring the connecting process and quality.

In summary, the structure design of the electronic expansion valve according to the present application enables the sight glass to be connected to the valve seat assembly conveniently, and can ensure the connecting process and the connecting quality.

BRIEF DESCRIPTION OF THE DRAWINGS

FIG. 2-1 is a schematic structural view of an electronic expansion valve in a first embodiment of the present application;

FIG. 2-2 is another schematic structural perspective view of the electronic expansion valve in FIG. 2-1;

FIG. 3-1 is a schematic structural view of an electronic expansion valve in a second embodiment of the present application;

FIG. 3-2 is another schematic structural perspective view of the electronic expansion valve in FIG. 3-1;

FIG. 4-1 is a schematic structural view illustrating the adaptation of the valve stem and the lower valve seat of the electronic expansion valve in FIG. 4;

FIG. 4-2 is an isometric view of the lower valve seat in FIG. 4-1;

FIG. 4-3 is a schematic structural view illustrating the adaptation of the valve stem and the lower valve seat in another embodiment;

FIG. 5-1 is a schematic structural view illustrating the adaptation of the valve seat and the valve stem in FIG. 5;

FIG. 6-1 is a top view of the housing assembly in FIG. 6; and

FIG. 6-2 is a bottom view of the housing assembly in FIG. 6.

Figure 1:
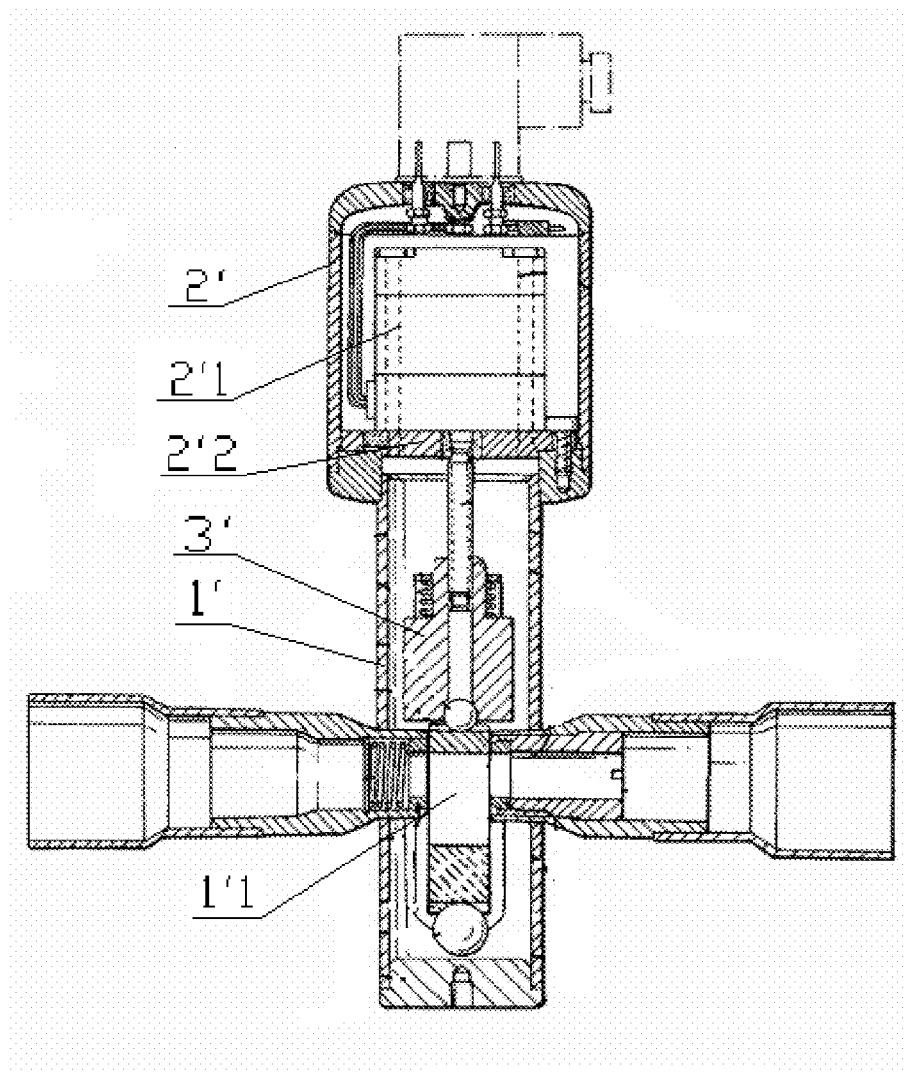
FIG. 1 is a schematic structural view of an electronic expansion valve in the prior art.

The description of the reference numerals in FIG. 1:
1' valve seat assembly, 1'1 valve port, 2' housing assembly,
2'1 motor; 2'2 gear system, 3' valve stem assembly;
The description of the reference numerals in FIGS. 2-1 to 6-2:
1 valve seat, 11 upper valve seat, 12 lower valve seat,
121 valve port, 122 sleeve extension, 123 first sealing surface,
13 mounting plane, 14 first step surface; 2 valve stem,
21 second step surface, 22 second sealing surface; 3 opening groove,
41 first connecting tube, 42 second connecting tube; 5 housing assembly,
51 electric motor, 52 gear system, 53 housing,
54 pin base, 55 pin, 56 glass alloy,
57 anti-mismatch jacket; 6 valve stem assembly, 61 lead screw,
62 gear seat; 7 valve seat assembly; 8 sight glass,
81 glass base, 82 sealing member, 83 indicator paper,
84 clamping piece, 85 glass block; 9 cover.

DETAILED DESCRIPTION OF THE INVENTION

An aspect of the present application is to provide an electronic expansion valve, which is designed such that the sight glass can be connected to the valve seat assembly conveniently while ensuring the connecting process and connecting quality.

For those skilled in the art to understand better the technical solutions of the present application, the present application will be further explained in detail in conjunction with the accompanying drawings and specific embodiments.

Figures 1, 2:
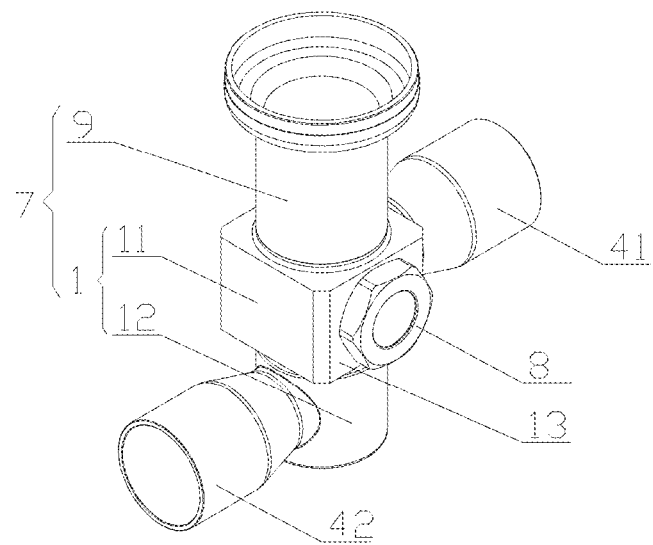
Figure 2:
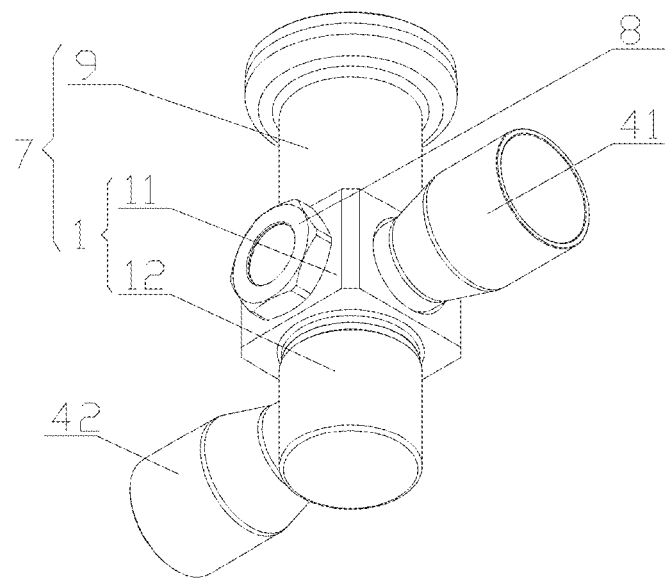
Figures 1, 3:
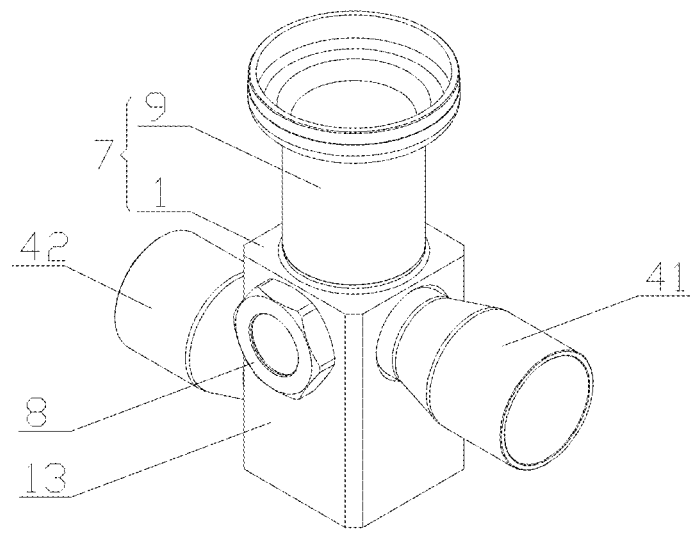
Figures 2, 3:
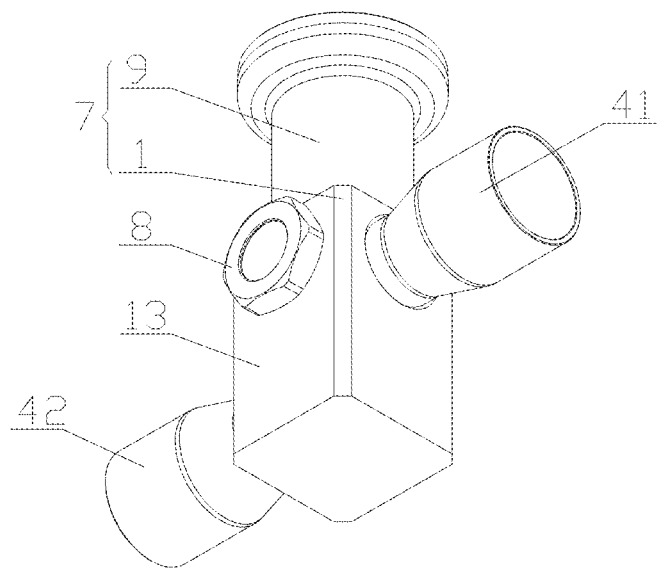

Referring to FIGS. 2-1, 2-2, 3-1 and 3-2, FIG. 2-1 is a schematic structural view of an electronic expansion valve in a first embodiment of the present application; FIG. 2-2 is another schematic structural perspective view of the electronic expansion valve in FIG. 2-1; FIG. 3-1 is a schematic structural view of an electronic expansion valve in a second embodiment of the present application; and FIG. 3-2 is another schematic structural perspective view of the electronic expansion valve in FIG. 3-1.

In the fundamental technical solution, as shown in FIGS. 2-1 to 3-2, the electronic expansion valve according to the present application includes a valve seat assembly 7 and a housing assembly 5 connected with the valve seat assembly 7. A valve stem assembly 6 and a valve port 121 are provided in the inner chamber of the valve seat assembly 7, and an electric motor 51 is provided in the inner chamber of the housing assembly 5. The motor 51 drives the valve stem assembly 6 to move along an axial direction via a gear system 52 so as to regulate the flow quantity of fluid flowing through the valve port 121.

On the basis of the above structures, as shown in FIGS. 2-1 and 3-2, the valve seat assembly 7 is of a separable structure, including a valve seat 1 and a cover 9 connected to the valve seat 1. The cover 9 is connected with the housing assembly 5. A mounting plane 13 is provided on the outer side surface of the valve seat 1, and a sight glass 8 is connected to the mounting plane 13.

Compared with the prior art, the valve seat assembly 7 according to the present application is of a separable structure including a valve seat 1 and a cover 9, the cover 9 being a cylindrical member easily connected with the housing assembly 5. Since the valve seat 1 and the cover 9 are separate, the valve seat 1 may be of a non-cylindrical member, for example, a cubical valve seat or a valve seat in any other shape on which a plane is easy to be manufactured. Thus, the mounting plane 13 is easy to be manufactured on the valve seat 1. As compared with the structure design of connecting a sight glass on a saddle surface, the structure design of connecting the sight glass 8 onto the mounting plane 13 enables an easy and simple connection with the sight glass 8 while ensuring the connecting process and quality.

On the basis of the above fundamental technical solutions, further improvements may be made and thus the first embodiment of the present application is acquired. Specifically, referring to FIGS. 2-1 and 2-2, in the first embodiment, the valve seat 1 is further of a separable structure including an upper valve seat 11 and a lower valve seat 12 connected with the upper valve seat 11. The cover 9 is further connected to the upper valve seat 11. The mounting plane 13 is further provided on the outer side surface of the upper valve seat 11. The separable structure design of the valve seat 1 may enable the mounting plane 13 to be provided only on the upper valve seat 11, therefore simplifying the manufacture process. Furthermore, the lower valve seat 12 may be in a cylindrical shape which needs less material, and thus the valve seat material is saved.

Specifically, referring to FIGS. 2-1 and 2-2, the upper valve seat 11 is further a cubical valve seat, and any one of the outer side surfaces of the cubical valve seat forms the mounting plane 13. The structure design of the cubical valve seat can easily form the mounting plane 13, and since each of the four outer side surfaces of the cubical valve seat may serve as the mounting plane 13 of the sight glass 8, the sight glass 8 is allowed to be connected to any one of the outer side surfaces of the cubical valve seat according to the specific application environment. Further, the cubical valve seat may be formed of a square bar by lathe machining. The square bar material has a low cost and is easily available, thereby significantly reducing costs of production. Furthermore, the square bar is made of stainless steel, thereby improving the strength and anti-corrosion performance of the valve seat.

Furthermore, another improvement may further be made to the valve seat so as to achieve a second embodiment of the present application. Specifically, as shown in FIGS. 3-1 and 3-2, the valve seat 1 is further of an integrated structure, and is a cubical valve seat as a whole. Any one of the outer side surfaces of the cubical valve seat forms the mounting plane 13. In such a structure design that the valve seat 1 is of an integrated structure and is a cubical valve seat as a whole, the structure of the valve seat 1 may be simplified, and the number of the members and components may be reduced, therefore simplifying the assembling process and cost.

Figure 4:
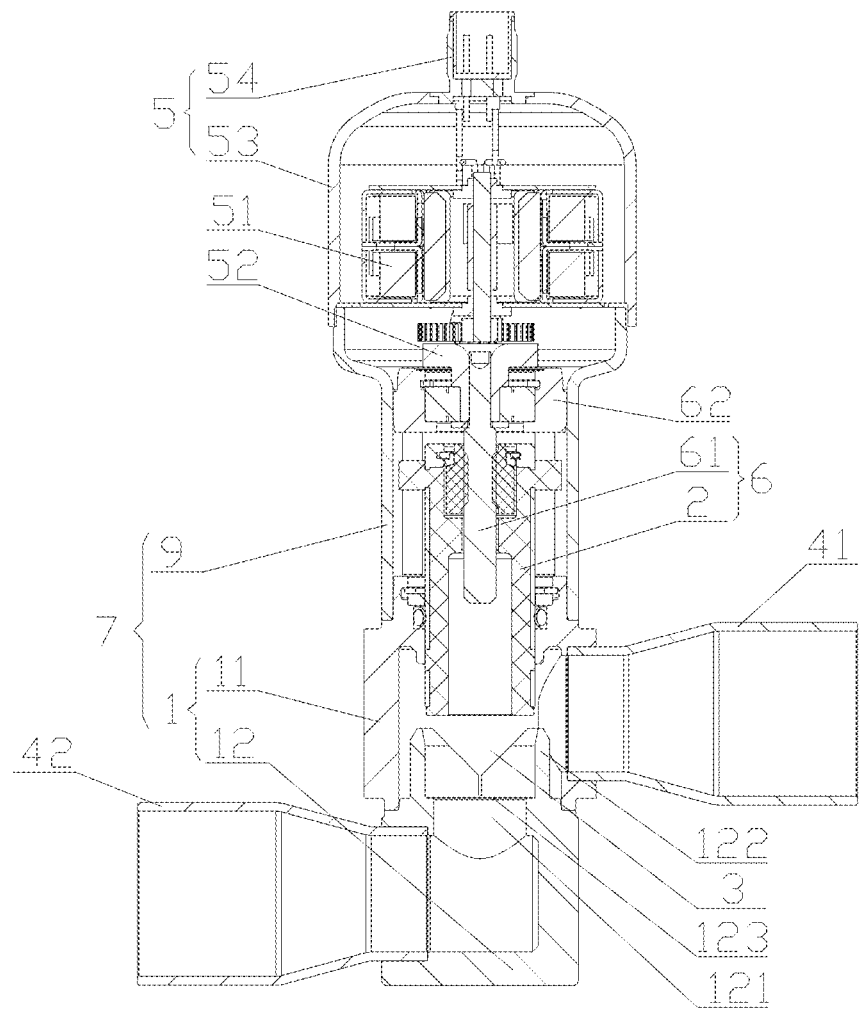
FIG. 4 is a sectional view of the electronic expansion valve in FIG. 2-1.
Figures 1, 4:
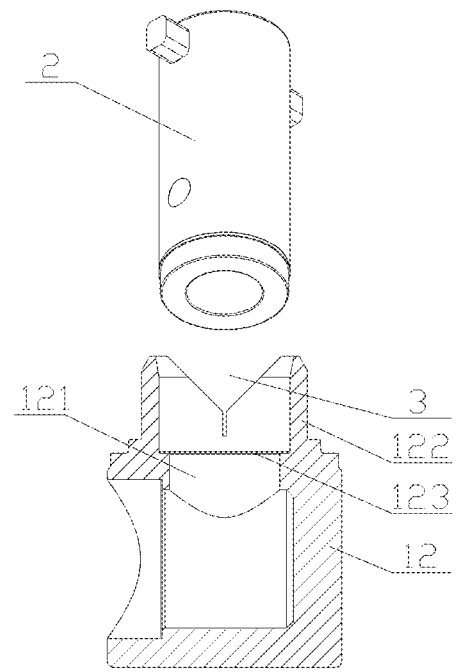
Figures 2, 4:
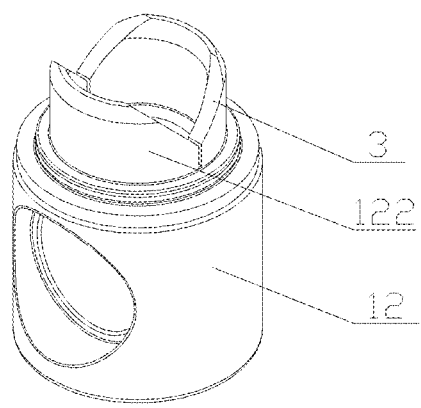
Figure 4:
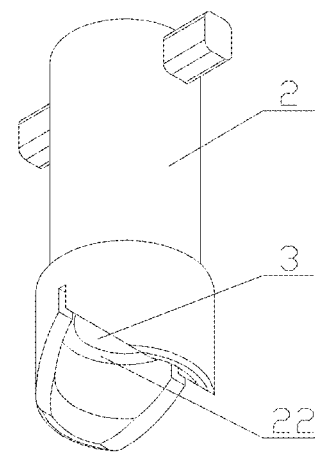
Figure 3:
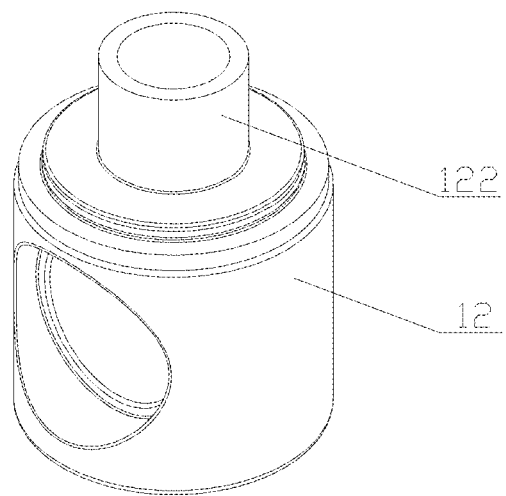

Referring to FIGS. 4, 4-1 and 4-2, FIG. 4 is a sectional view of the electronic expansion valve in FIG. 2-1; FIG. 4-1 is a schematic structural view illustrating the adaptation of the valve stem and the lower valve seat of the electronic expansion valve in FIG. 4; and FIG. 4-2 is an isometric view of the lower valve seat in FIG. 4-1.

In the above first embodiment, further improvements may also be made. For example, based on this, as shown in FIGS. 4 to 4-2, the valve port 121 is provided in the lower valve seat 12, and is provided with a sleeve extension 122 extending upwards in an axial direction. The sleeve extension 122 extends into the chamber of the upper valve seat 11, and the valve stem assembly 6 is provided with a tubular valve stem 2. An opening groove 3 configured to regulate the flow quantity is provided on a circumferential side wall of one of the sleeve extension 122 and the lower end portion of the valve stem 2, and one of the sleeve extension 122 and the lower end portion of the valve stem 2 enters into or is withdrawn out of the other, (i.e., the sleeve extension 122 enters into or is withdrawn out of the lower end portion of the valve stem 2, or the lower end portion of the valve stem 2 enters into or is withdrawn out of the sleeve extension 122) so as to block or enable communication between the opening groove 3 and the valve port 121.

The shape of the opening groove 3 corresponds to a flow curve as required. The opening groove 3 may be, for example, a V-shaped groove, a Y-shaped groove or any other shaped groove. Depending on a flow curve as desired in the refrigerating system, the opening groove 3 corresponding thereto may be provided on the circumferential side wall of the sleeve extension 122 or the side wall of the lower end portion of the valve stem 2. In operation, as the valve stem 2 is disengaged from the sleeve extension 122, the opening groove 3 begins to communicate with the valve port 121 at a small flow, and as the valve stem 2 is further disengaged from the sleeve extension 122, the flow area through the opening groove 3 gradually increases, and the flow quantity of the refrigerant gradually increases, until the opening groove 3 is fully opened so as to communicate with the valve port 121 at the biggest flow. It may be seen that the flow regulating valve according to the present application can provide the flow curve as required.

Furthermore, since the lower end portion of the valve stem 2 is a cylinder, and not a cone, the refrigerant pressure applied to the lower end of the valve stem 2 is constant. Also, since the valve stem 2 is tubular and extends along an axial direction, the refrigerant pressure applied to the upper end of the valve stem 2 is equal to the refrigerant pressure applied to the lower end of the valve stem 2. In the event that the force area of the upper end of the valve stem 2 is equal to the force area of the lower end of the valve stem 2; the refrigerant pressure exerted onto the valve stem 2 in an axial direction is balanced.

It is to be noted that, in the above embodiments, an opening groove 3 may be provided on the side wall of the sleeve extension 122, or on the lower end portion of the valve stem 2; and in the two technical solutions, the communication between the opening groove 3 and the valve port 121 may be blocked or achieved by pushing or withdrawing the sleeve extension 122 into or out of the lower end portion of the valve stem 2, or by pushing or withdrawing the lower end portion of the valve stem 2 into or out of the sleeve extension 122.

As shown in FIGS. 4 to 4-2, the opening groove 3 is provided on the circumferential side wall of the sleeve extension 122. In this case, as shown in FIGS. 4-1 and 4-2, the sleeve extension 122 is provided with a first sealing surface 123 located below the bottommost end of the opening groove 3. The first sealing surface 123 may be further arranged inside the sleeve extension 122. In this case, as shown in FIGS. 4-1 and 4-2, the lower end portion of the valve stem 2 enters into or is withdrawn out of the sleeve extension 122, such that the lower end surface of the base body 21 comes into contact seal against or is disengaged from the first sealing surface 122. In such a structure design, the lower end surface of the base body 21 is to seal against the first sealing surface 123. The lower end surface of the base body 21, due to a high rigidity, is not easily deformed, and thus can significantly improve the sealing performance and service life as compared with the structure design of the sealing sheet in the prior art.

The processing includes: manufacturing a valve port 121 and a sleeve extension 122 on the lower valve seat 12, and manufacturing an opening groove 3 on the sleeve extension, and then manufacturing the upper valve seat 11, and finally assembling the finished lower valve seat 12 and upper valve seat 11. It may be known that, the separable structure design of the valve seat 1 allows the sleeve extension 122 and the opening groove to be manufactured very easily and simplifies the manufacture process.

Furthermore, as shown in FIG. 4, a first connecting tube 41 is connected to the upper valve seat 11, and a second connecting tube 42 is connected to the lower valve seat 12. This structure design may facilitate regulating the position relationship between the first connecting tube 41 and the second connecting tube 42 according to the requirement of the refrigerating system environment space. For example, the first connecting tube 41 and the second connecting tube 42 are arranged in parallel or at a 90-degree angle therebetween.

In the above first embodiment, further improvements may also be made. For example, referring to FIG. 4-3, FIG. 4-3 is a schematic structural view illustrating the adaptation of the valve stem and the lower valve seat in another embodiment.

As shown in FIG. 4-3, the opening groove 3 may also be provided on the lower end portion of the valve stem 2. In this case, the lower end portion of the valve stem 2 is provided with a second sealing surface 22 located above the uppermost end of the opening groove 3, and further, the second sealing surface 22 may be provided inside the lower end portion of the valve stem 2. In this case, as shown in FIG. 4-3, the sleeve extension 122 may further enter into or be withdrawn out of the lower end portion of the valve stem 2, such that the upper end surface of the sleeve extension 122 comes into contact seal against or is disengaged from the second sealing surface 22. In such a structure design, the upper end surface of the sleeve extension 122 is to seal against the second sealing surface 22. The second sealing surface 22, due to high rigidity, is not easily deformed, and thus can significantly improve the sealing performance and service life as compared with the structure design of the sealing sheet in the prior art.

Figure 5:
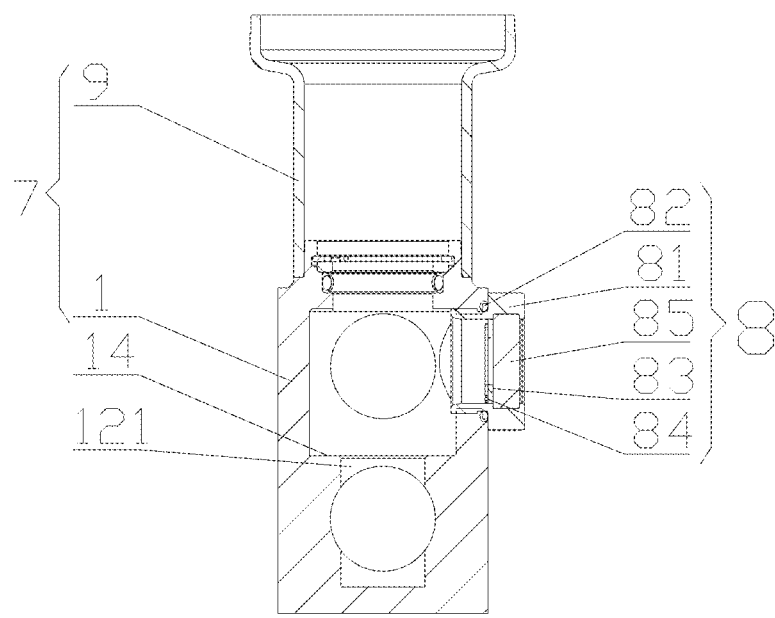
FIG. 5 is a sectional view of the valve seat assembly of the electronic expansion valve in FIG. 3-1 and a sight glass.
Figures 1, 5:
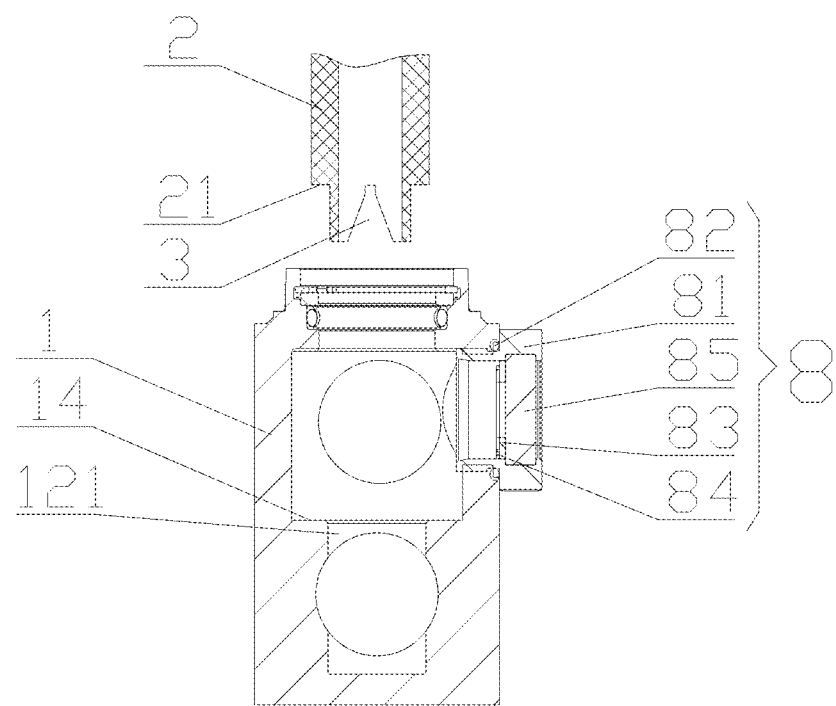

Referring to FIGS. 5 and 5-1, FIG. 5 is a sectional view of the valve seat assembly of the electronic expansion valve in FIG. 3-1 and a sight glass; and FIG. 5-1 is a schematic structural view illustrating the adaptation of the valve seat and the valve stem in FIG. 5.

In the above second embodiment, further improvements may also be made. For example, the valve port 121 is provided with a first step surface 14 circumferentially. The valve stem assembly 6 includes a tubular valve stem 2, and a second step surface 21 and an opening groove 3 configured to regulate the flow quantity are provided on the side wall of the lower end portion of the valve stem 2. The lower end portion of the valve stem 2 protrudes into or removes out of the valve port 121, such that the first step surface 14 comes into contact seal against or is disengaged from the second step surface 21. Apparently, this structure design may regulate the flow.

On the basis of any one of the above technical solutions, the mounting structure for the sight glass 8 may further be designed particularly. For example, referring to FIGS. 5 and 5-1, a threaded hole is provided in the mounting plane 14, and the sight glass 8 includes a glass base 81 connected into the threaded hole by thread fit. A sealing member 82 is further provided between the glass base 81 and the wall of the threaded hole. The structure design of the mounting plane 13 easily achieves the thread connection between the glass base 81 and the threaded hole. Besides, since the sight glass 8 is connected to the mounting plane 13, not the saddle surface, the sealing member 82 is allowed to be mounted.

Furthermore, as shown in FIGS. 5 and 5-1, a glass block 85, an indicator paper 83 and a clamping piece 84 for mounting the indicator paper 83 inside the glass base 81 are further provided on the glass base 81. As the refrigerant is under different temperatures or different phases, the color of the indicator paper 83 may become different. Thus, the temperature or phase of the refrigerant may be substantially known from the color variation of the indicator paper 83.

Figure 6:
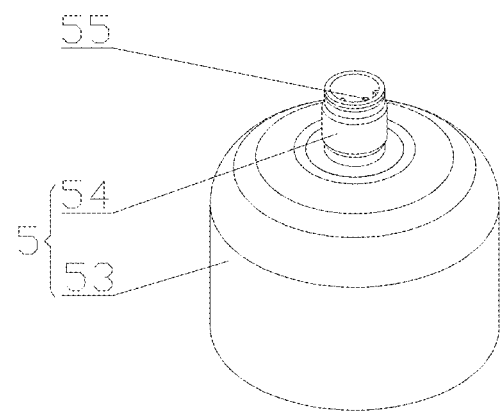
FIG. 6 is a schematic structural view of the housing assembly in FIGS. 2-1 to 3-2.
Figures 1, 6:
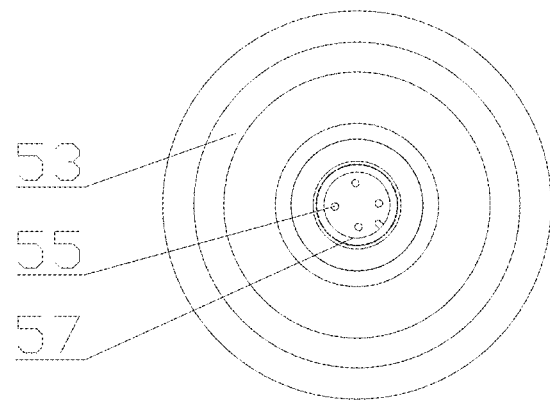
Figures 2, 6:
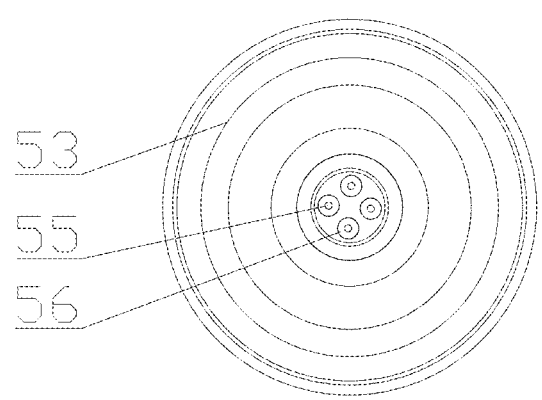

Further, the specific structure of the housing assembly 5 may be designed further. Referring to FIGS. 6, 6-1, and 6-2, FIG. 6 is a schematic structural view of the housing assembly in FIGS. 2-1 to 3-2; FIG. 6-1 is a top view of the housing assembly in FIG. 6; and FIG. 6-2 is a bottom view of the housing assembly in FIG. 6.

Specifically, as shown in FIGS. 6 to 6-2, the housing assembly 5 includes a housing 53 and a pin base 54 connected with the housing 53. The upper portion of the housing 53 is provided with a cap cover, and a center hole is provided in the center portion of the cap cover, with the pin base 54 being connected into the center hole. Furthermore, as shown in FIG. 6-2, pins 55 are fixedly packaged inside the pin base 54 by packaging material such as glass alloy 56. As shown in FIG. 6-1, an anti-mismatch jacket 57 is further provided in the pin base 54 so as to prevent the mismatch between a connector and the pins 55.

Furthermore, in any one of the above technical solutions, the valve seat assembly 7 may be made of stainless steel, that is, the valve seat assembly 7 may be a stainless steel valve seat assembly with high strength and excellent anticorrosion performance.

Finally, it is to be noted that, as shown in FIG. 4, the electronic expansion valve disclosed is configured to regulate the flow of the refrigerant. As shown in FIG. 3, the electronic expansion valve includes a housing assembly 5, and an electric motor 51 is provided in the housing assembly 5, wherein an output shaft of the electric motor 51 is in transmission connection with the lead screw 61 of the valve stem assembly 6 via a gear system 52 such that the lead screw 61 rotates along with the output shaft of the electric motor. As shown in FIG. 4, the gear system 52 is supported on the gear seat 62, and the lead screw 61 passes through the gear seat 62 to be connected with a valve stem 2. As the lead screw 61 rotates, the valve stem 2 moves up and down along an axial direction, so that the flow of the refrigerant is regulated.

An electronic expansion valve according to the present application has been described above in detail. Specific examples are used herein to illustrate the principle and embodiments of the present application. It is noted that the above description of the embodiments is given only for the purpose of better understanding the method of the present application and the idea thereof. It should be noted that, various improvements and modifications can be made to the application by those skilled in the art without departing from the principle of the present application, and these improvements and modifications also fall within the scope of protection defined by the claims of the application.

The invention claimed is:

1. An electronic expansion valve, comprising a valve seat assembly and a housing assembly connected with the valve seat assembly, wherein a valve stem assembly and a valve port are provided in an inner chamber of the valve seat assembly, and an electric motor is provided in an inner chamber of the housing assembly, the electric motor is configured to drive, via a gear system, the valve stem assembly to move along an axial direction so as to regulate quantity of fluid flowing through the valve port, wherein the valve seat assembly is of a separable structure comprising a valve seat and a cover connected to the valve seat, the cover is connected with the housing assembly, a mounting plane is provided on an outer side surface of the valve seat, and a sight glass is connected to the mounting plane;

wherein the valve seat is of a separable structure comprising an upper valve seat and a lower valve seat connected with the upper valve seat, the cover is connected to the upper valve seat, the mounting plane is provided on an outer side surface of the upper valve seat; and wherein the valve port is provided in the lower valve seat, and is provided with a sleeve extension protruding upwards in an axial direction, the sleeve extension extends into a chamber of the upper valve seat, and the valve stem assembly is provided with a tubular valve stem and a conduit extends through the valve stem in the axial direction, and a lower end portion of the valve stem is a cylinder; an opening groove configured to regulate the flow quantity is provided on a circumferential side wall of one of the sleeve extension and a lower end portion of the valve stem, and one of the sleeve extension and the lower end portion of the valve stem is configured to be pushed into or withdrawn out of the other so as to block or enable communication between the opening groove and the valve port.

2. The electronic expansion valve according to claim 1, wherein the upper valve seat is further a cubical valve seat, and any one of outer side surfaces of the cubical valve seat is capable of forming the mounting plane.

3. The electronic expansion valve according to claim 1, wherein the valve port is provided with a first step surface circumferentially; the valve stem assembly comprises a tubular valve stem, and a second step surface and an opening groove configured to regulate the flow quantity are provided on a side wall of the lower end portion of the valve stem, the lower end portion of the valve stem is configured to be pushed into or withdrawn out of the valve port, such that the first step surface comes into contact seal against or is disengaged from the second step surface.

4. The electronic expansion valve according to claim 1, wherein a threaded hole is provided in the mounting plane, and the sight glass comprises a glass base, the glass base is connected into the threaded hole in a thread-fit way.

5. The electronic expansion valve according to claim 4, wherein a sealing member is further provided between the glass base and a wall of the threaded hole.

6. The electronic expansion valve according to claim 1, wherein the housing assembly comprises a housing and a pin base connected with the housing, the housing assembly is connected to the cover by way of the housing, and pins are packaged in the pin base by injection moulding.

7. The electronic expansion valve according to claim 1, wherein the valve seat assembly is further a stainless steel valve seat assembly.

* * * * *